(12) United States Patent
Minakuchi et al.

(10) Patent No.: US 11,070,280 B2
(45) Date of Patent: Jul. 20, 2021

(54) RELAY DEVICE, RELAY PROGRAM, RELAY METHOD, AND LIVE VIDEO IMAGE DISTRIBUTION SYSTEM

(71) Applicant: FUJITSU LIMITED, Kawasaki (JP)

(72) Inventors: Yu Minakuchi, Yokohama (JP); Hideyuki Matsuda, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/281,999

(22) Filed: Feb. 21, 2019

(65) Prior Publication Data

US 2019/0273554 A1 Sep. 5, 2019

(30) Foreign Application Priority Data

Mar. 2, 2018 (JP) .............................. JP2018-037334

(51) Int. Cl.
*H04B 7/155* (2006.01)
*H04N 21/45* (2011.01)
(Continued)

(52) U.S. Cl.
CPC .......... *H04B 7/155* (2013.01); *H04B 7/2606* (2013.01); *H04N 7/147* (2013.01); *H04N 21/4508* (2013.01); *H04W 36/0005* (2013.01)

(58) Field of Classification Search
CPC ... H04W 36/02; H04W 28/14; H04W 36/023; H04W 36/08; H04W 36/32; H04W 88/04; H04W 24/00; H04W 24/02; H04W 36/00; H04W 36/0007; H04W 36/0011; H04W 36/0016; H04W 36/0061; H04W 36/0072; H04W 36/0083; H04W 36/00835;
(Continued)

(56) References Cited

U.S. PATENT DOCUMENTS 7,590,064 B1 * 9/2009 Zhang .................... H04B 7/155
370/235
10,091,700 B1 * 10/2018 Liu ........................ H04W 4/025
(Continued)

FOREIGN PATENT DOCUMENTS

| JP | 2003-30085 | 1/2003 |
| JP | 2006-101315 | 4/2006 |
| JP | 2012-15745 | 1/2012 |

OTHER PUBLICATIONS

Japanese Office Action dated May 25, 2021 from Japanese Application No. 2018-037334, 7 pages.

*Primary Examiner* — Golam Sorowar
(74) *Attorney, Agent, or Firm* — Staas & Halsey LLP

(57) ABSTRACT

A relay device includes, a storage configured to receive distributed video data, and store the received video data, a predictor configured to predict a communication disabled period in which the terminal device is disabled to perform communication, and a transmission controller configured to start transmission of the stored video data to the terminal device after a start delay period elapses from the start of the storing, wherein the transmission controller transmits the video data, which is to be played by the terminal device in a communication enabled period in which the terminal device is predicted to be enabled to perform communication and in the communication disabled period following the communication enabled period, to the terminal device in the communication enabled period.

13 Claims, 12 Drawing Sheets

(51) Int. Cl.
*H04W 36/00* (2009.01)
*H04N 7/14* (2006.01)
*H04B 7/26* (2006.01)

(58) Field of Classification Search
CPC ....... H04W 36/00837; H04W 36/0094; H04W 36/18; H04L 47/263; H04L 47/30; H04L 47/10; H04L 47/14; H04L 47/34; H04L 65/4084; H04L 29/06; H04L 29/06027; H04L 65/1083; H04L 65/607; H04L 67/2857; H04N 21/41407; H04N 21/2385; H04N 21/2387; H04N 21/24; H04N 21/2401; H04N 21/2402; H04N 21/2407; H04N 21/251; H04N 21/25891; H04N 21/4335; H04N 21/44004; H04N 21/4402; H04N 21/44209; H04N 21/4758; H04N 21/4788; H04N 21/4825; H04N 21/6125
See application file for complete search history.

(56) References Cited

U.S. PATENT DOCUMENTS

| | | | |
|---|---|---|---|
| 2005/0141477 A1* | 6/2005 | Tomita | H04W 36/02 370/349 |
| 2006/0116074 A1 | 6/2006 | Kato et al. | |
| 2010/0074221 A1* | 3/2010 | Hong | H04W 36/0011 370/331 |
| 2012/0322497 A1* | 12/2012 | Navda | H04W 36/0085 455/525 |
| 2013/0055301 A1* | 2/2013 | Hao | H04H 20/57 725/14 |
| 2018/0091986 A1* | 3/2018 | Pedersen | H04W 36/02 |

\* cited by examiner

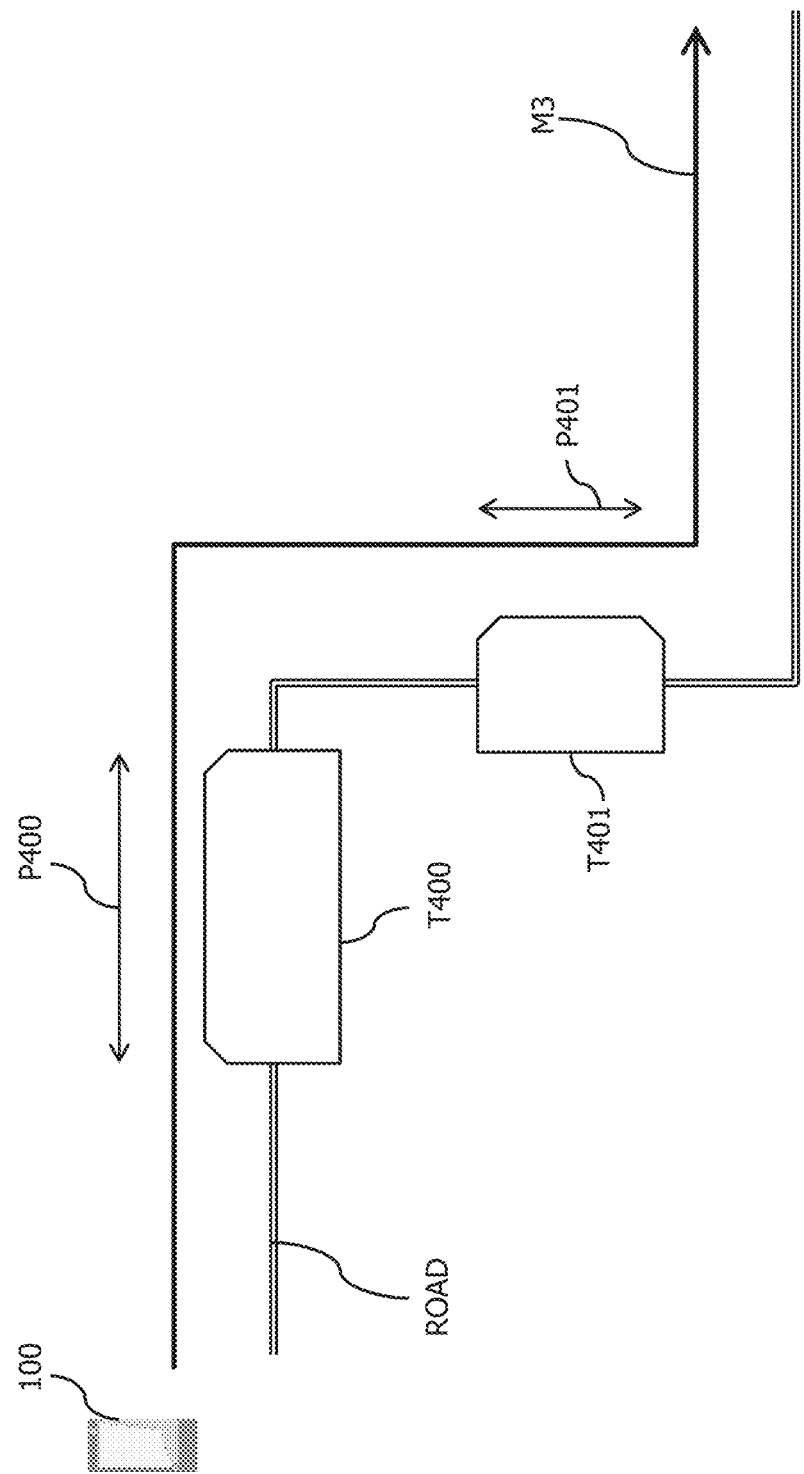

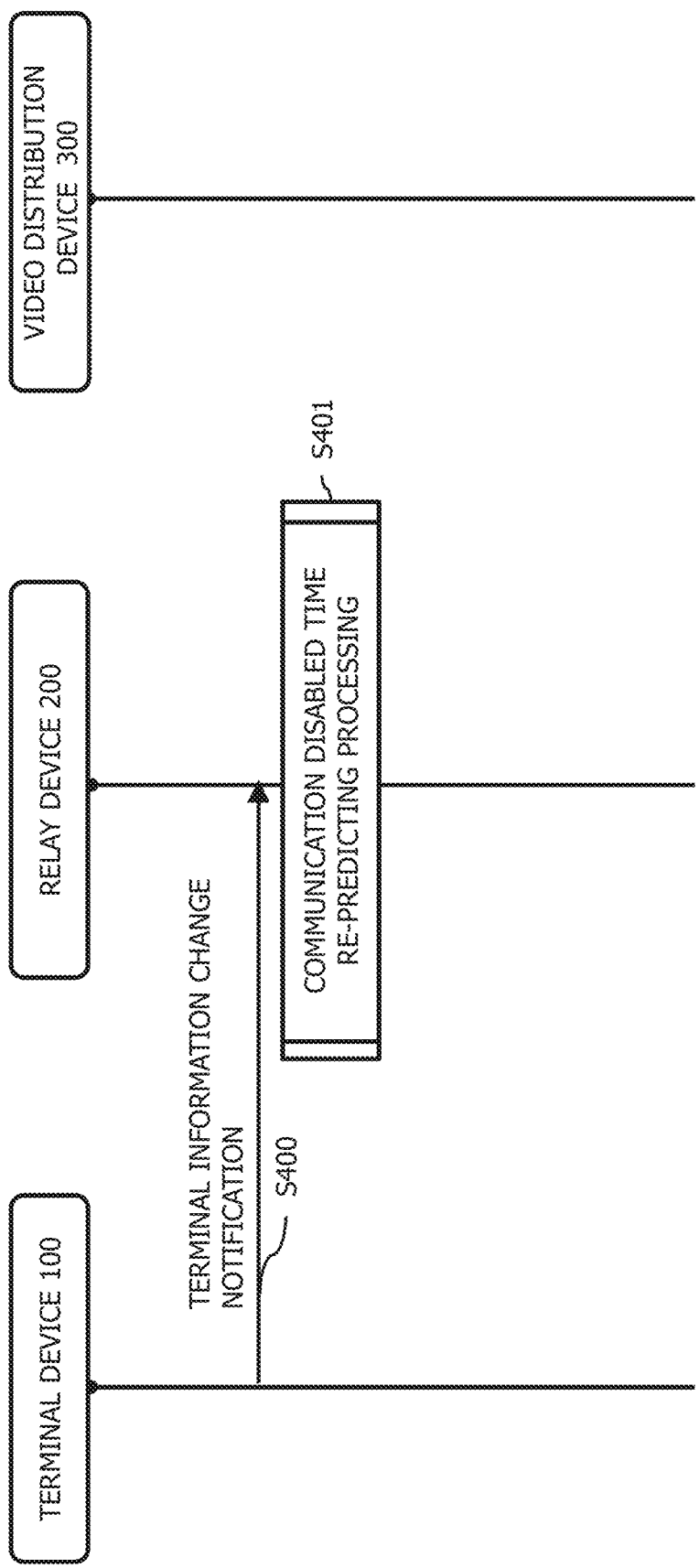

RELAY DEVICE, RELAY PROGRAM, RELAY METHOD, AND LIVE VIDEO IMAGE DISTRIBUTION SYSTEM

CROSS-REFERENCE TO RELATED APPLICATION

This application is based upon and claims the benefit of priority of the prior Japanese Patent Application No. 2018-037334, filed on Mar. 2, 2018, the entire contents of which are incorporated herein by reference.

FIELD

The present invention relates to a relay device, a relay program, a relay method, and a live video image distribution system.

BACKGROUND

In some radio communication systems, a frequency band that is used may be expanded to support an increase in communication volume. A communication area of a base station device, in which radio connection with a terminal device is possible, differs depending on a frequency band used for the radio communication.

For example, a communication area of a base station device in the fourth generation mobile communication system (4G) is about 2 Km, but a communication area of a base station may, in some cases, be about a 100 m in the fifth generation mobile communication system (5G) which uses an even higher frequency band. Terminal devices receive such a service as live video image distribution while moving through a plurality of communication areas.

The techniques related to the radio communication are disclosed in Japanese Laid-open Patent Publication No. 2006-101315 and Japanese Laid-open Patent Publication No. 2003-030085.

SUMMARY

A relay device in a communication system including a terminal device, a video distribution device configured to distribute video data to the terminal device, and the relay device configured to relay video data distributed by the video distribution device, the relay device includes, a storage configured to receive distributed video data, and store the received video data, a predictor configured to predict a communication disabled period in which the terminal device is disabled to perform communication, and a transmission controller configured to start transmission of the stored video data to the terminal device after a start delay period elapses from the start of the storing, wherein the transmission controller transmits the video data, which is to be played by the terminal device in a communication enabled period in which the terminal device is predicted to be enabled to perform communication and in the communication disabled period following the communication enabled period, to the terminal device in the communication enabled period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram depicting an example of predicting the communication disabled period based on the predicted peripheral information.

FIG. 12 is a diagram depicting an example of a sequence of a terminal information change notification.

DESCRIPTION OF EMBODIMENTS

A decrease in the communication area of the base station device may increase the frequency of a handover occurring for a terminal device to switch a base station with which radio connection is performed. When a user of a terminal device is viewing a live video image, such as a live sports broadcast for example, the handover may frequently cause events to interrupt the reception of the video image data, and disturb viewing of live video images.

Configuration Example of Communication System

Figure 1:
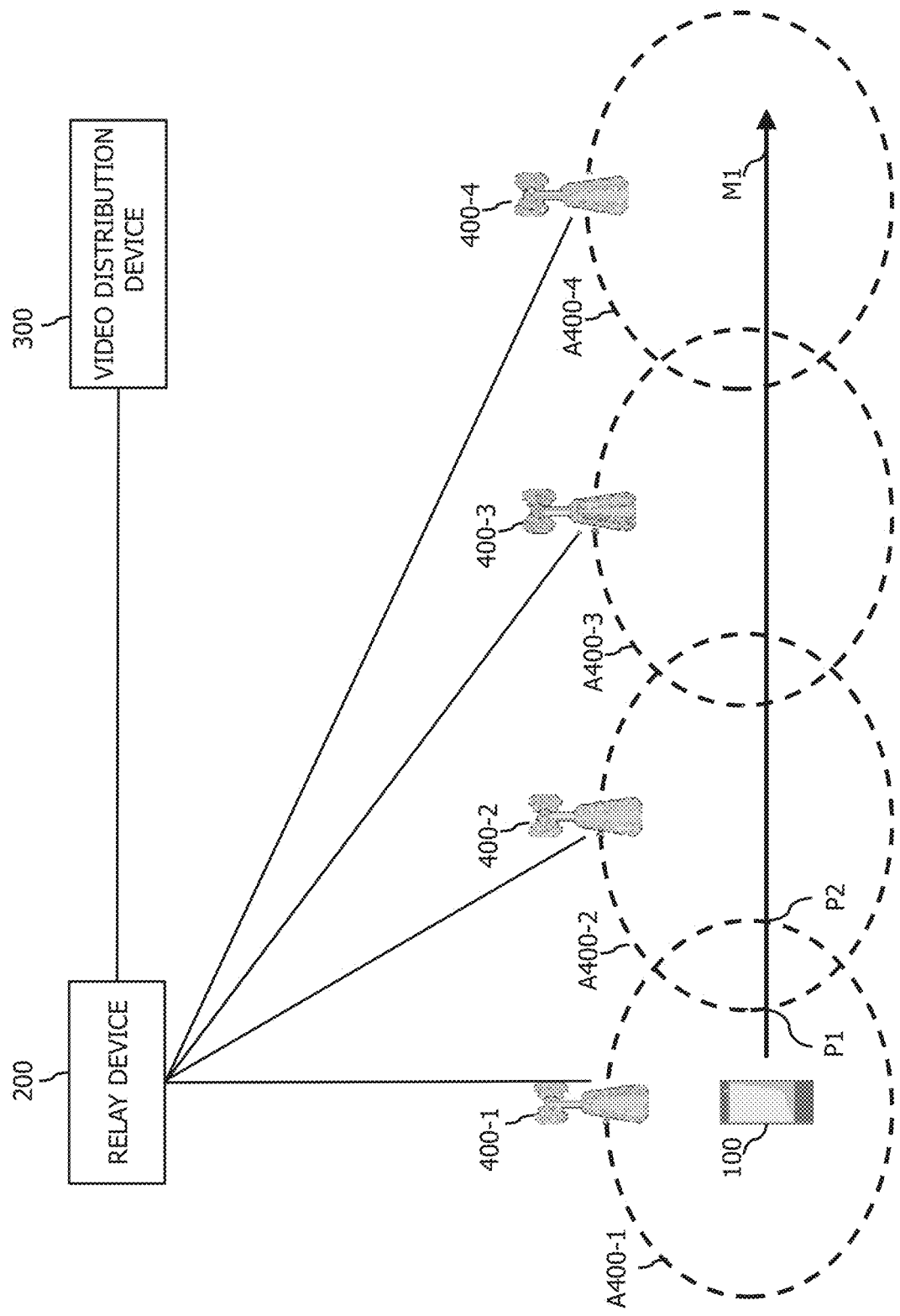
FIG. 1 is a diagram depicting a configuration example of a communication system 10.

FIG. 1 is a diagram depicting a configuration example of a communication system 10. The communication system 10 includes a terminal device 100, a relay device 200, a video distribution device 300, and base station devices 400-1 to 400-4 (also called "base station 400" herein below). The communication system 10 is a live video image distribution system which distributes live video images to the terminal device 100, for example.

The terminal device 100 is a mobile communication apparatus, such as a smartphone. The terminal device 100 performs radio connection with the base station device 400, and communicates with the relay device 200 and the video distribution device 300 via the base station device 400.

The base station device 400 is an evolved Node B (eNodeB) in a communication system that conforms to the long term evolution (LTE) standard, or is gNodeB in 5G. The base station devices 400-1 to 400-4 have communication areas A400-1 to A400-4 respectively, which are ranges where radio communication with the terminal device 100 is possible. Each of the communication areas A400-1 to A400-4 has a circular configuration, with a 100 m radius from the base station device 400, for example.

The video distribution device 300 is, for example, a server machine of a broadcast station or a live video image distribution site, which broadcasts live video images, such as sports broadcasts. The video distribution device 300 is a device that distributes live video images to the terminal device 100 according to a request from the terminal device 100. The video distribution device 300 transmits the video data of the live video images to the terminal device 100 regularly and irregularly. The video distribution device 300 transmits 1 second video data to the terminal device 100 per second, for example.

The relay device 200 is a computer, for example. The relay device 200 receives video data from the video distribution device 300, and stores the video data in an internal memory. Then the relay device 200 starts transmission of the stored video data to the terminal device 100 after a predetermined time elapses.

In the communication system 10, the terminal device 100 moves in the direction of the arrow M1, for example. As indicated by the arrow M1, the terminal device 100 switches the base station devices 400 with which radio communication is performed, sequentially from the base station device 400-1 to the base station device 400-4. The terminal device 100 performs handover to switch the base station devices 400 with which radio communication is performed. For example, when the intensity of the radio wave from the base station device 400-1 becomes a predetermined value or less, the terminal device 100 starts handover to the base station device 400-2, and the handover completes when the radio connection with the base station device 400-2 completes. For example, it is assumed that the terminal device 100 starts the handover near a point P1 located in the communication area A400-2, and completes the handover near the point P2 at which the communication area A400-1 ends. In this case, the handover is performed when the terminal device 100 is moving from the point P1 to the point P2, during which the terminal device 100 is disabled to perform the radio communication.

Hence the relay device 200 performs the following processing, so that viewing of the live video images is not interrupted, even during the handover.

The relay device 200 predicts the period when communication of the terminal device 100 is disabled (communication disabled time or communication disabled period). Then the relay device 200 does not transmit the video data during the communication disabled time (communication disabled period), and transmits the video data, which the terminal device 100 plays in the communication disabled time, during the communication enabled time (communication enabled period) when communication is possible. Since the relay device 200 does not transmit data during the communication disabled time, the use of communication resources to resend the video data is controlled.

Further, the relay device 200 does not transmit the video data, which is received from the video distribution device 300 and stored, to the terminal device 100 immediately, but starts transmission after a start delay period elapses. The start delay period is time based on the communication disabled time, and is, for example, the maximum communication disabled times or the time determined by adding a predetermined time (e.g. 1 second) to the maximum communication disabled time. By setting the start delay period, the relay device 200 stores video data for a certain time, and can transmit the data, which will be played, during the predicted communication disabled time, before the communication is disabled.

Embodiment 1

Embodiment 1 will be described first. The relay device 200 stores the video data distributed (transmitted) from the video distribution device 300 to the internal memory. Then the relay device 200 predicts the communication disabled time when the terminal device 100 is disabled to perform communication, and starts transmission of the stored video data to the terminal device 100 after the start delay period elapses from the start of storing the video data. Further, the relay device 200 transmits the video data, which is to be played by the terminal device 100 in a communication enabled period in which the terminal device is predicted to be enabled to perform communication, and in the communication disabled period following the communication enabled period, to the terminal device 100 in the communication enabled period.

Configuration Example of Relay Device

Figure 2:
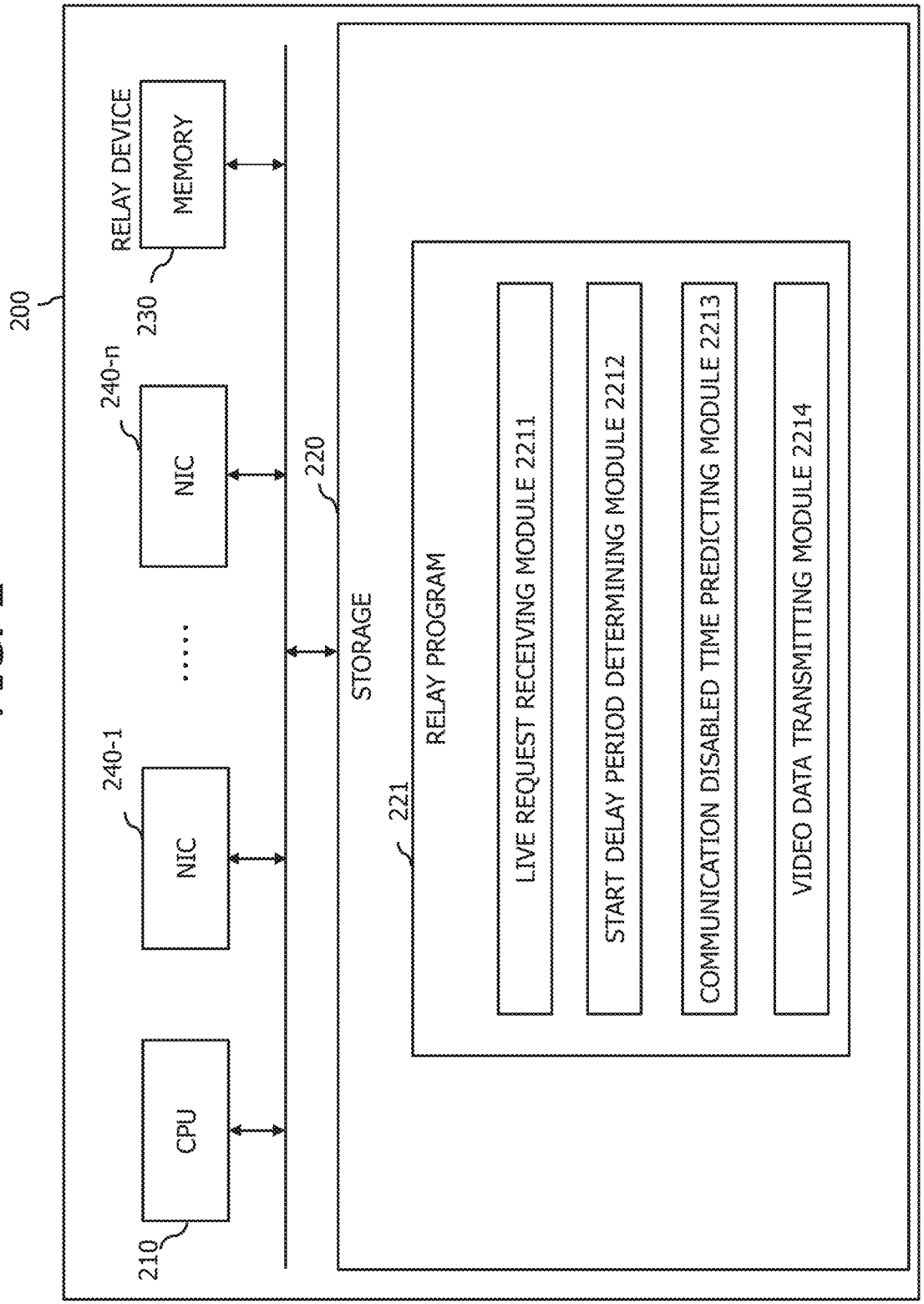
FIG. 2 is a diagram depicting a configuration example of the relay device 200.

FIG. 2 is a diagram depicting a configuration example of the relay device 200. The relay device 200 includes a central processing unit (CPU) 210, a storage 220, a memory 230, and network interface cards (NIC) 240-1 to 240-n (also called "NIC 240" herein below). The relay device 200 is a device which transmits data to or receives data from another communication device, and is a computer or a server machine, for example.

The storage 220 stores programs and data, and is an auxiliary storage device, such as a flash memory, a hard disk drive (HDD), or a solid-state drive (SSD). The storage 220 includes a relay program 221.

The memory 230 is a region to load a program stored in the storage 220. The memory 230 is also used as a region for the program to store data.

The NIC 240 is a device which is connected to another communication device or a network, and performs communication, and is a network interface card, for example. The NIC 240 may be connected with another communication device or a network via a hub or the like, for example.

The CPU 210 is a processor or a computer, which loads a program stored in the storage 220 to the memory 230, executes the loaded program, and implements each processing.

The CPU 210 executes the relay program 221, so as to implement a storage, a predictor and a transmission controller, and performs relay processing. The relay processing is a processing of receiving video data distributed from the video distribution device 300, storing the received video data in the internal memory, and starting transmission of the stored video data to the terminal device 100 after the start delay period elapses.

The CPU 210 performs a live request receiving processing by executing a live request receiving module 2211 included in the relay program 221. The live request receiving processing is a processing of receiving a live request transmitted from the terminal device 100.

The CPU 210 performs a start delay period determining processing by executing a start delay period determining module 2212 included in the relay program 221. The start delay period determining processing is a processing of determining the start delay period.

The CPU 210 performs a communication disabled time predicting processing by executing a communication disabled time predicting module 2213 included in the relay program 221. The communication disabled time predicting processing is a processing of predicting the time when the terminal device 100 is enabled to perform communication, and the communication disabled time when the terminal device 100 is disabled to perform communication.

The CPU 210 performs a video data transmitting processing by executing a video data transmitting module 2214 included in the relay program 221. The video data transmitting processing is a processing of transmitting video data stored in the internal memory to the terminal device 100.

Live Video Image Relay Processing

Figure 3:
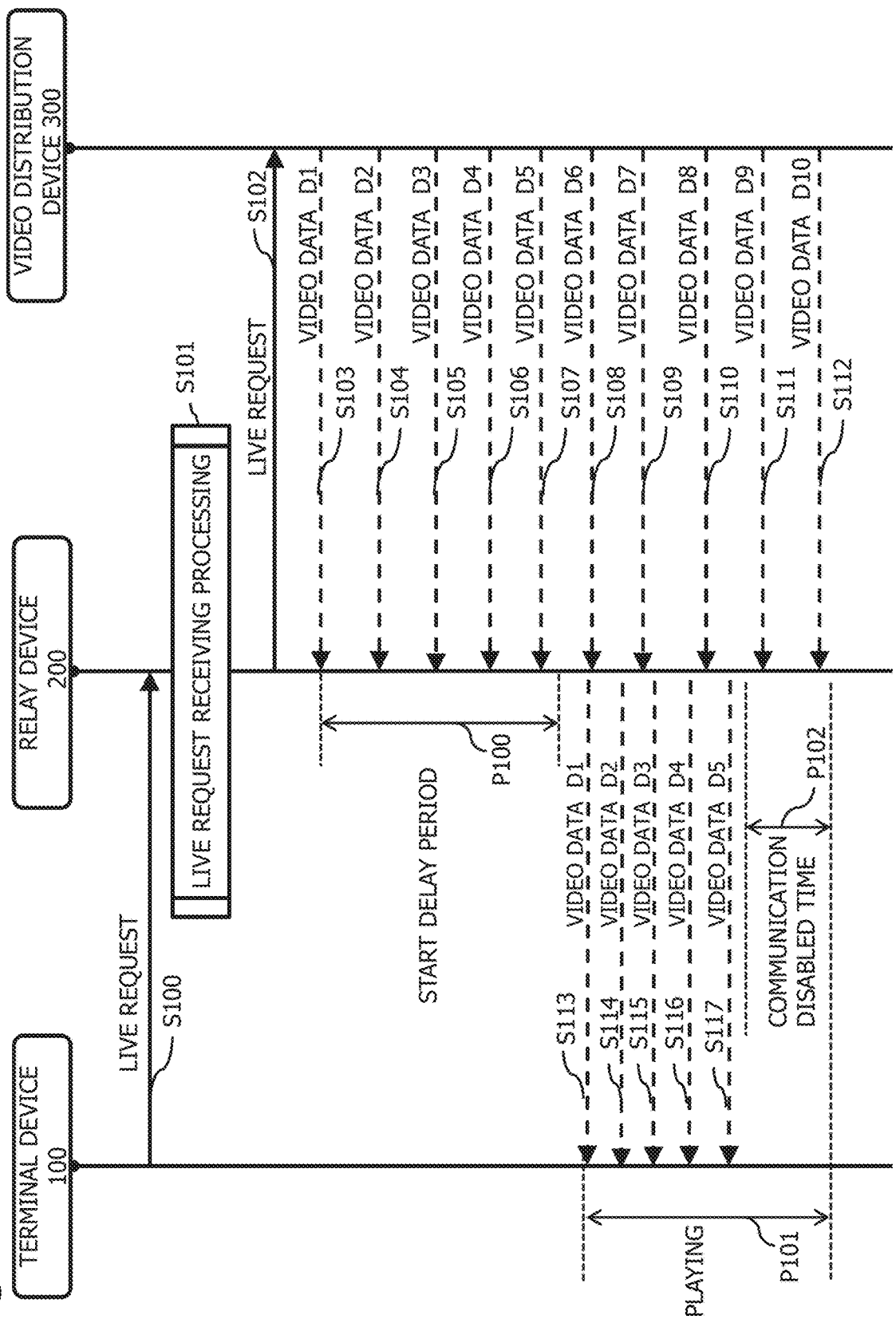
FIG. 3 is a diagram depicting an example of a sequence of the live video image relay processing performed in the communication system 10.

FIG. 3 is a diagram depicting an example of a sequence of the live video image relay processing performed in the communication system 10. The terminal device 100 transmits a live request to the relay device 200 when the distribution of the live video images is started, for example (S100). When the live request is received, the relay device 200 performs the live request receiving processing (S101).

Figure 4:
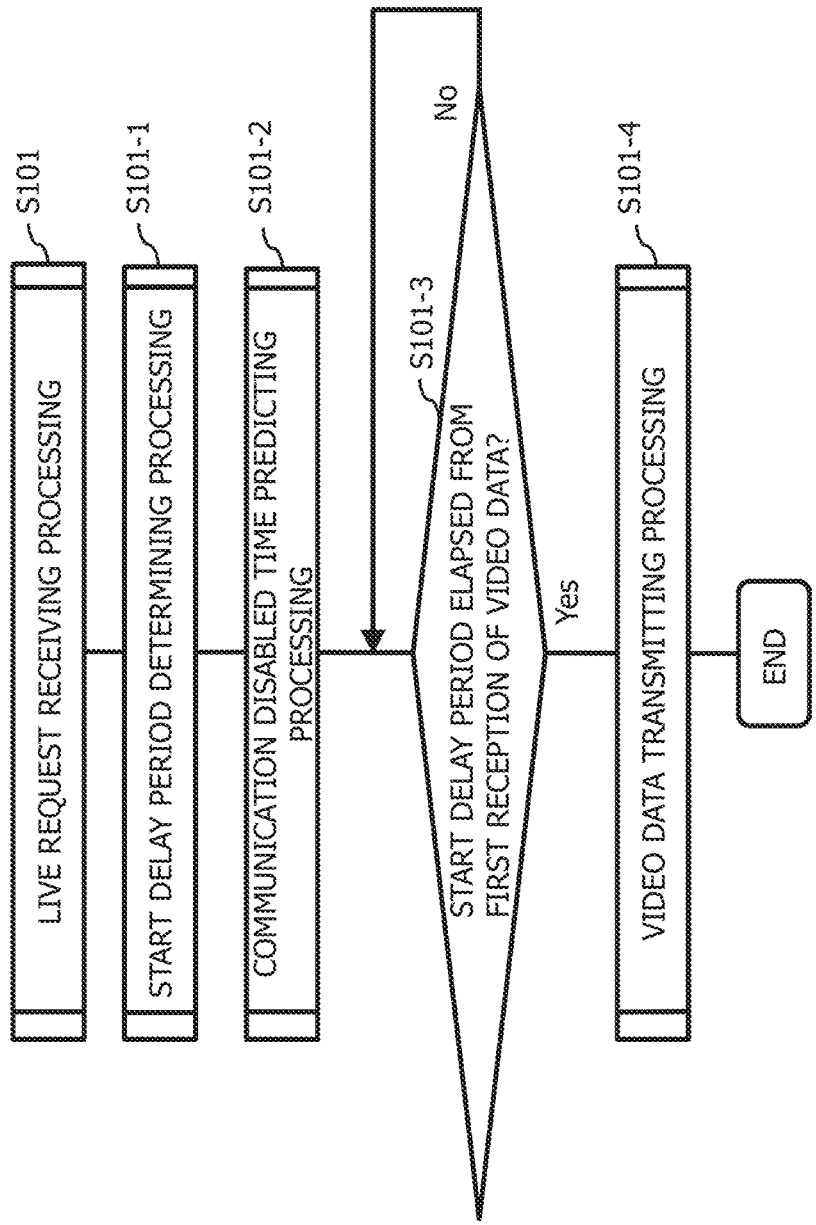
FIG. 4 is a processing flow chart depicting an example of the live request receiving processing S101.

FIG. 4 is a processing flow chart depicting an example of the live request receiving processing S101. First, the relay device 200 performs the start delay period determining processing (S101-1). The start delay period determining processing S101-1 is a processing of determining the start delay period. The start delay period is time from the start of relay device 200 receiving the distributed video data to the start transmitting the data to the terminal device 100. The start delay period determining processing S101-1 will be described in detail later.

When the start delay period is determined, the relay device 200 performs the communication disabled time predicting processing (S101-2). The communication disabled time predicting processing S101-2 is a processing of predicting the communication disabled time when the terminal device 100 is disabled to perform communication, for example. The communication disabled time predicting processing S101-2 will be described in detail later.

When the communication disabled time is predicting, the relay device 200 waits until the start delay period elapses after the first reception of video data (No in S101-3). When the start delay period elapses (Yes in S101-3), the relay device 200 performs the video data transmitting processing (S101-4), and ends processing. The video data transmitting processing S101-4 is a processing of transmitting the video data at a timing when the terminal device 100 is enabled to perform communication. The video data transmitting processing S101-4 will be described in detail later.

Figure 5:
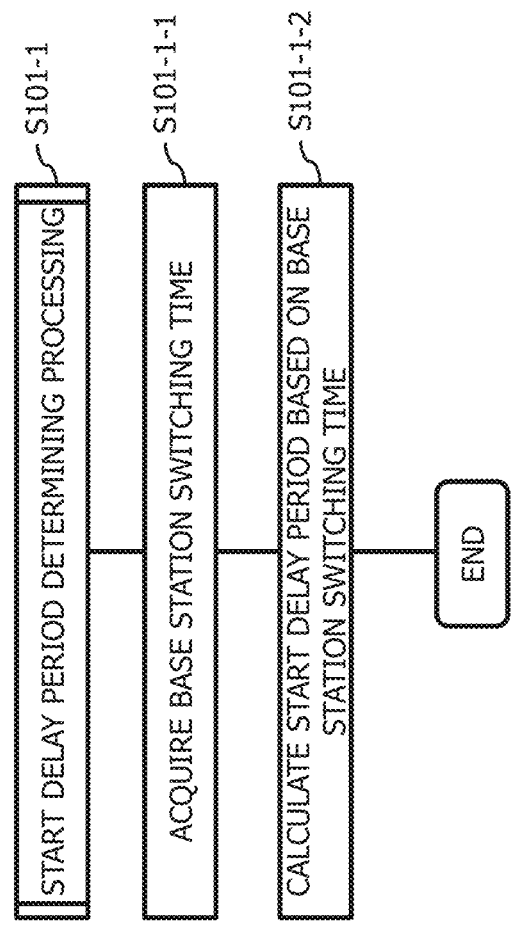
FIG. 5 is a processing flow chart depicting an example of the start delay period determining processing S101-1.

FIG. 5 is a processing flow chart depicting an example of the start delay period determining processing S101-1. In the start delay period determining processing S101-1 in FIG. 5, the start delay period is calculated based on the base station switching time.

The relay device 200 acquires the base station switching time (S101-1-1). The base station switching time is time it takes for the terminal device 100 to switch base station devices 400 with which radio communication is performed, and is time from the start of the handover to the completion of the handover, for example. The base station switching time is time when the terminal device 100 is disabled to perform the radio communication, that is, a communication disabled time. The base station switching time is time based on the value actually measured in the past, for example. The base station switching time may be the mean value or the maximum value of the time that is theoretically takes for handover. Furthermore, the base station switching time may be time that is calculated based on the set value, such as a transmission output value, of each base station device 400.

In the case of storing the base station switching time in a memory or a storage, the relay device 200 may acquire the base station switching time by reading the stored time. The relay device 200 may acquire the base station switching time by calculation.

The relay device 200 calculates the start delay period based on the acquired base station switching time (S101-1-2), and ends the processing. The relay device 200 regards the maximum value of the base station switching time as the start delay period, for example. The relay device 200 may regard the time determined by adding an additional time (a short amount of time, such as 1 second) to the base station switching time as the start delay period, for example.

Figure 6:
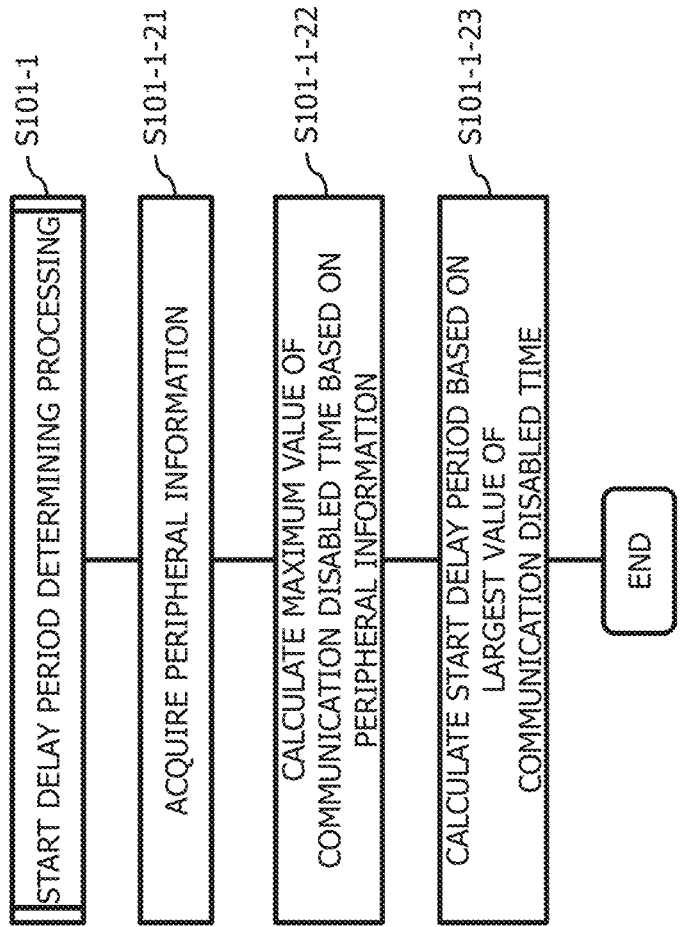
FIG. 6 is a processing flow chart depicting an example of the start delay period determining processing S101-1.

FIG. 6 is a processing flow chart depicting an example of the start delay period determining processing S101-1. In the start delay period determining processing S101-1 in FIG. 6, the communication disabled time other than the base station switching time is also calculated, and the start delay period is calculated based on the calculated communication disabled time.

The relay device 200 acquires peripheral information (S101-1-21). The peripheral information is information on a peripheral area of the terminal device 100, such as information on the base station device 400 (e.g. position and transmission output of the base station device 400), and position information on obstacles (e.g. tunnel, building) which is predicted to disable radio communication. The relay device 200 acquires the peripheral information by reading the peripheral information stored in the memory, for example. The relay device 200 may acquire the peripheral information from the terminal device 100.

The relay device 200 calculates the maximum value of the communication disabled time based on the peripheral information (S101-1-22). The maximum value of the communication disabled time is, for example, a maximum value of theoretical or actual values of the base station switching time, or a maximum value of time, within a predetermined time, in which the terminal device 100 is predicted to have passed through an obstacle.

The relay device 200 calculates the start delay period based on the maximum value of the communication disabled time (S101-1-23), and ends the processing. The relay device 200 regards the maximum value of the communication disabled time as the start delay period, for example. The relay device 200 may regard the time determined by adding an addition time to the communication disable time as the start delay period, for example.

Figure 7:
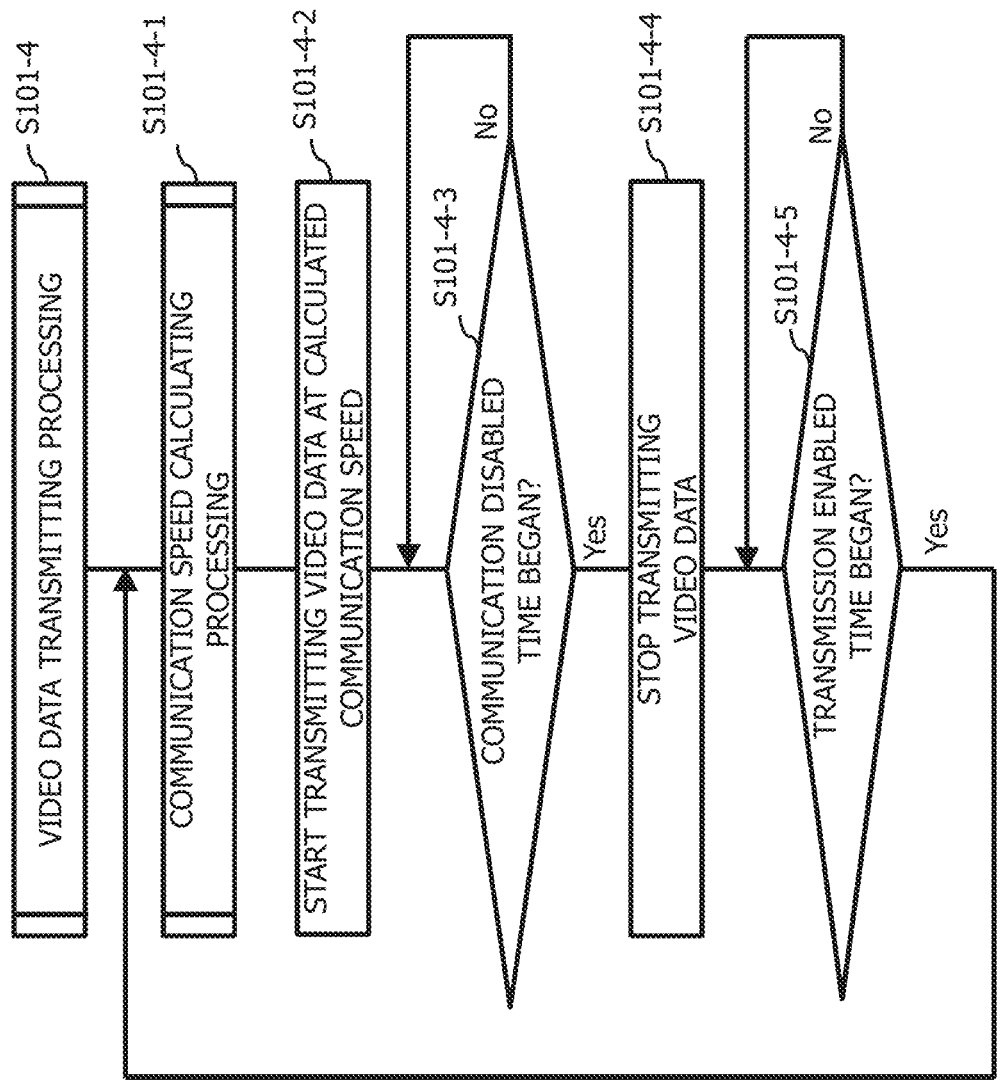
FIG. 7 is a processing flow chart depicting an example of the video data transmitting processing S101-4.

FIG. 7 is a processing flow chart depicting an example of the video data transmitting processing S101-4. The relay device 200 performs a communication speed calculating processing (S101-4-1).

The communication speed calculating processing S101-4-1 is a processing of calculating a communication speed to transmit the video data to the terminal device 100. In the communication speed calculating processing S101-4-1, the relay device 200 calculates the communication speed based on the volume of the video data to be transmitted to the terminal device 100, and the communication enabled time when the terminal device 100 is enabled to perform communication. The relay device 200 calculates the communication speed by dividing a volume of the video data, which the terminal device 100 plays during the total time of the communication enabled time and the communication disabled time, by the communication enabled time, for example. For example, in the case when the volume of the video data is in proportion to the playing time of the video data, and video data totals 8 seconds (5 second communication enabled time and 3 second communication disabled time) is transmitted during the 5 second communication enabled time, and the communication speed is determined by dividing the volume of the 8 second video data by the 5 second communication enabled time, that is, the communication speed is a speed which allows transmitting 1.6 second video data every 1 second.

The relay device 200 starts transmission of the video data at the calculated communication speed (S101-4-2). The relay device 200 continues transmission of the video data until communication disabled time begins (No in S101-4-3).

When the communication disabled time begins (Yes in S101-4-3), the relay device 200 stops transmission of the video data (S101-4-4). Then the relay device 200 waits for the transmission enabled time to begin (No in S101-4-5).

When the transmission enabled time begins (Yes in S101-4-5), the relay device 200 performs the processing S101-4-1 to the processing S101-4-5 again. The relay device 200 repeats the above processing until the live broadcast ends.

Returning to the sequence in FIG. 3, the relay device 200 transmits a live request to the video distribution device 300 in the live request receiving processing S101 (S102). The live request may include an identifier of the terminal device 100, a time to distribute the video data (time for playing in the terminal device 100), a distributed video name (program name) and the like.

When the live request is received, the video distribution device 300 starts transmission of the video data in response to the reception of the live request. For example, the video distribution device 300 transmits 1 second video data at 1 second intervals. The video distribution device transmits from the video data D1 to the video data D10 at 1 second intervals, for example (S103 to S112). The video distribution device 300 continues the transmission of the video data at 1 second intervals even after the video data D10 is transmitted.

When the video data is received, the relay device 200 memorizes (stores) the video data in the internal memory. In the live request receiving processing S101, the relay device 200 stores the received video data, and waits for the start delay time P100 to elapse (S101-3 in FIG. 4). When the start delay period P100 elapses (Yes in S101-3 in FIG. 4), the relay device 200 starts transmission of the video data in the video data transmitting processing S101-4 (S101-4-2 in FIG. 7). The relay device 200 transmits the video data D1 to D5, including the data to be played by the terminal device 100 during the communication disabled time P102, before the communication disabled time begins (during the communication enabled time) (S113 to S117).

The terminal device 100 receives the video data D1 to D5 in the communication enabled time, and plays the received video data D1 to D5 in the playing time P101.

Figure 8:
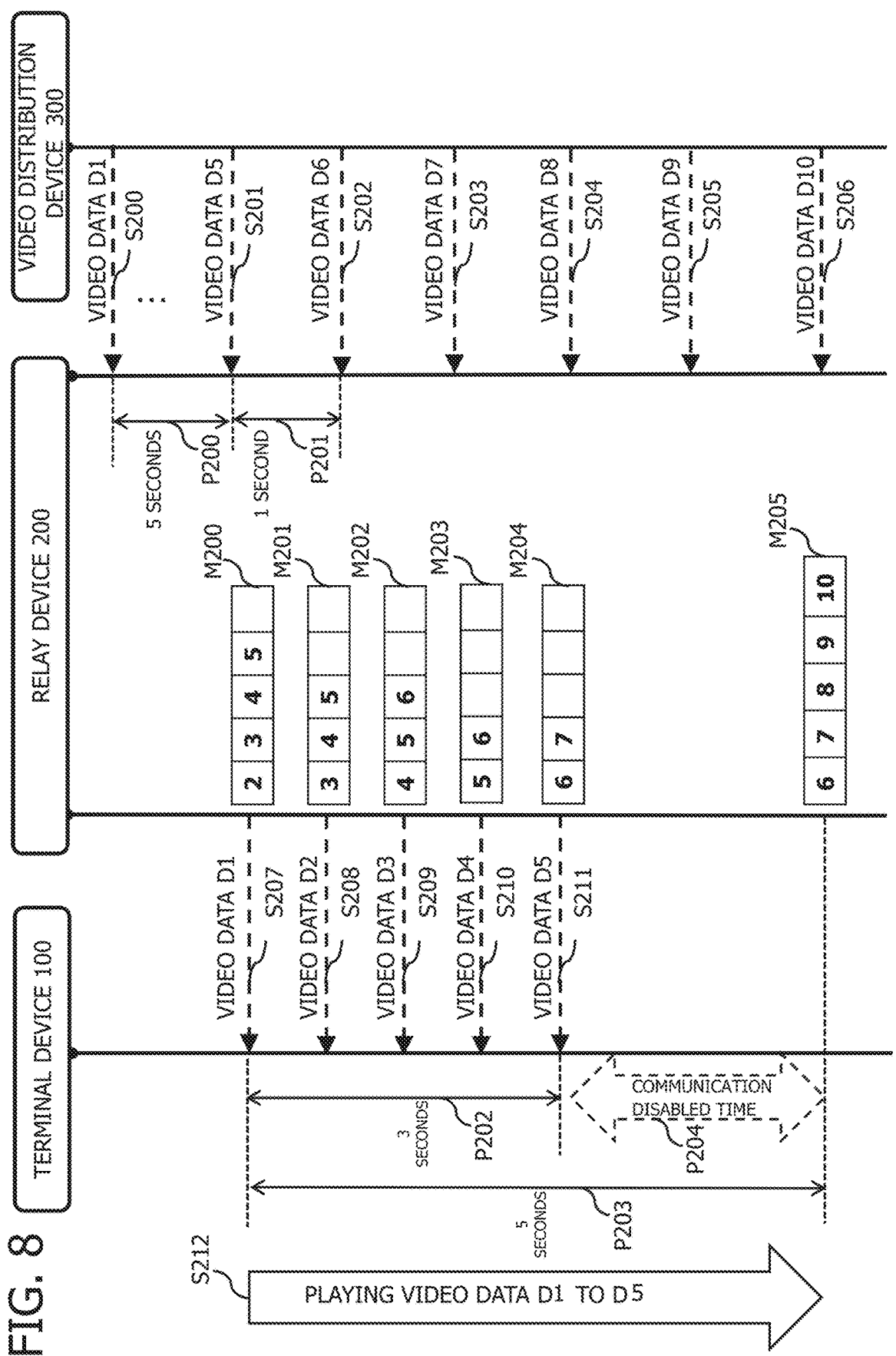
FIG. 8 is a diagram depicting an example of the video data stored in the relay device 200, and each timing.

FIG. 8 is a diagram depicting an example of the video data stored in the relay device 200, and each timing. The video distribution device 300 starts distribution of the video data when a live request is received, for example. The video data is, for example, 1 second video data, and is transmitted at 1 second intervals. Here the start delay period is assumed to be 5 seconds.

The video distribution device 300 transmits the video data D1 to D5 for 5 seconds (period P200) at 1 second intervals (S200, S201). Then the video distribution device 300 transmits the video data D6 to D10 at 1 second intervals (period P201) (S202 to S206).

When the 5 second start delay period elapses from the start of receiving the video data D1, the relay device 200 starts transmission of the video data D1 (S207). At this time, the video data D2 to D5 has been stored in the internal memory, where the relay device 200 stores the video data (M200).

During the 3 second communication enabled time (period P202), the relay device 200 transmits 5 second video data D1 to D5 to be played by the terminal device 100 for 5 seconds (period P203), which is the total of the period P202 and the communication disabled time (period P204). Therefore, the relay device 200 calculates the communication speed to transmit the five video data in 3 seconds (S101-4-1 in FIG. 7), and transmits the video data D1 to D5 at 0.6 second (3 seconds÷5) intervals (S207 to S211), for example.

While transmitting the video data D2, the relay device 200 stores the video data D3, D4 and D5 in the internal memory (M201). Then while transmitting the video data D3, the relay device 200 receives the video data D6, and stores the video data D4 to D6 in the internal memory (M202). Further, while transmitting the video data D4, the relay device 200 stores the video data D5 and D6 in the internal memory (M203). Furthermore, while transmitting the video data D5, the relay device 200 receives the video data D7, and stores the video data D6 and D7 in the internal memory (M204). In this way, the relay device 200 transmits the video data to the terminal device 100, while receiving the video data from the video distribution device.

When the communication disabled time begins, the relay device 200 stops the transmission of the video data (S101-4-4 in FIG. 7). In other words, the relay device 200 does not transmit the video data during the communication disabled time. During this period, the relay device 200 receives the video data D8 to D10, and stores the video data D6 to D10 in the internal memory (M205).

The terminal device 100, on the other hand, receives the video data D1, and starts playing the video data. The terminal device 100 plays the video data D1 to D5, which was received in the 3 second communication enabled time (period P202) in 5 seconds (S212).

In Embodiment 1, the relay device 200 predicts the communication disabled time when the terminal device 100 is disabled to perform the radio communication, and transmits the video data, which the terminal device 100 will play during the communication disabled time, in the communication enabled time when the communication is enabled. Thereby the terminal device 100 can play the video data of a live broadcast without interruption, even in the communication disabled time.

Further, the relay device 200 does not transmit the video data when the terminal device 100 is in the communication disabled time, hence the generation of resending the video data to the terminal device 100, due to a failure to transmit the video data to the terminal device 100, can be suppressed, and the communication resources can be used efficiently.

Embodiment 2

According to Embodiment 2, the relay device 200 predicts not only the communication disabled time and the communication enabled time, but also a base station device with which the terminal device 100 performs the radio communication in the communication enabled time. Then the relay device 200 transmits the video data to this base station device 400 with which the radio communication is performed.

Figure 9:
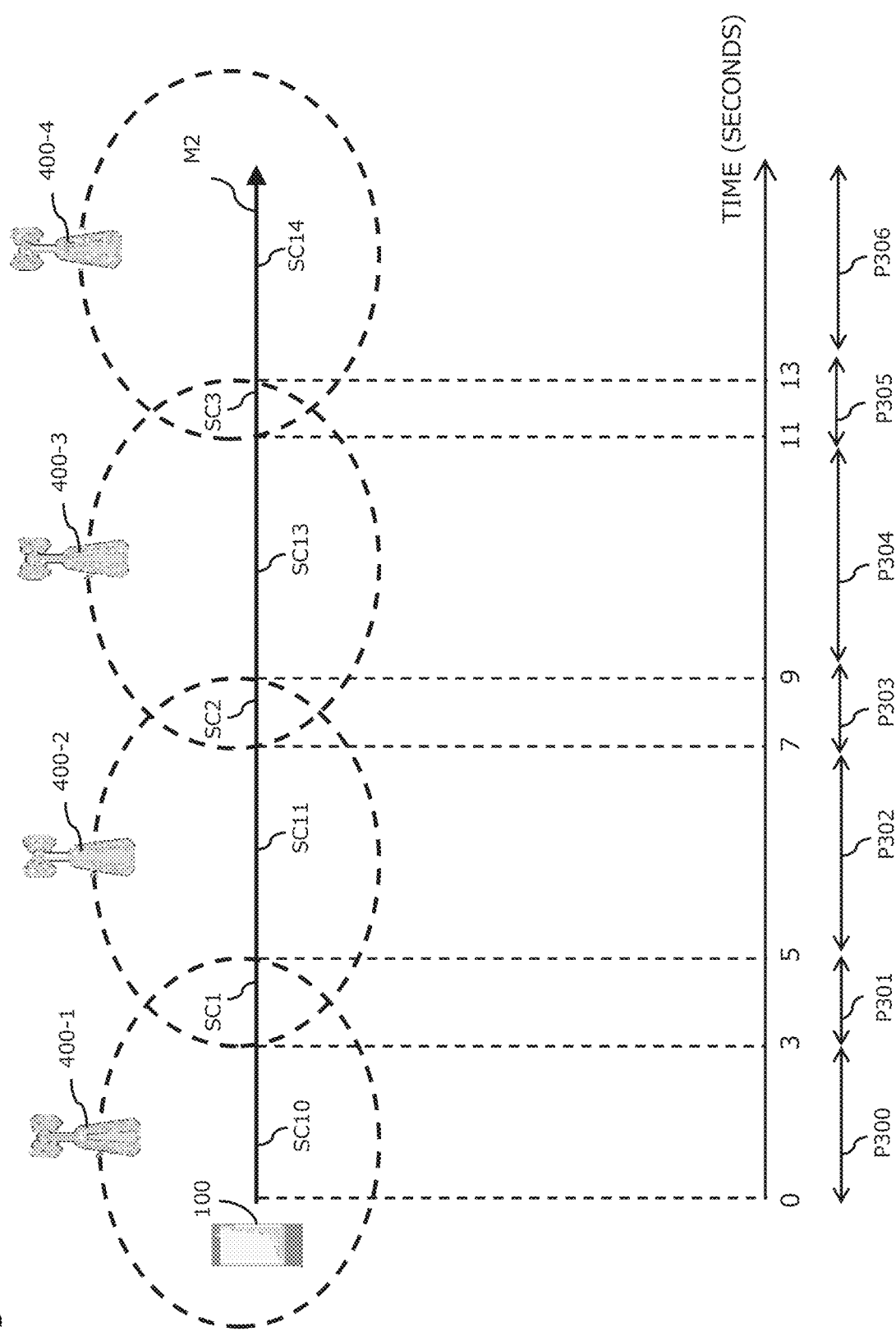
FIG. 9 is a diagram depicting an example of the base station switching that is performed in the terminal device 100.

FIG. 9 is a diagram depicting an example of the base station switching that is performed in the terminal device 100. The relay device 200 predicts that the terminal device 100 moves at a constant speed in the arrow M2 direction. For example, the relay device 200 acquires information on the position, the moving direction, and the moving speed of the terminal device 100 from the terminal device 100, and predicts the moving direction and the moving speed of the terminal device 100 based on the acquired information.

The relay device 200 predicts that the terminal device 100 will switch the base station devices 400 with which radio communication is performed, in the sequence of: the base station device 400-1, the base station device 400-2, the base station device 400-3, and the base station device 400-4.

When the terminal device 100 is located in a block where the communication areas of the base station devices 400 overlap, the relay device 200 predicts that communication is disabled because the terminal device 100 is in-handover. For example, the relay device 200 predicts 3 to 5 seconds (period P301), 7 to 9 seconds (period P303) and 11 to 13 seconds (period P305), where the terminal device 100 is located in the blocks SC1, SC2 and SC3 respectively, as the communication disabled times. Then the relay device 200 predicts 0 to 3 seconds (period P300), 5 to 7 seconds (period P302), 9 to 11 seconds (period P304) and 13 seconds and later (period P306), where the terminal device 100 is located in the blocks SC10, SC11, SC13 and SC14 respectively, as the communication enabled times. Further, the relay device 200 predicts that the terminal device 100 performs the radio communication with the base station device 400-1 in period P300, with the base station device 400-2 in period P302, with the base station device 400-3 in period P304, and with the base station device 400-4 in period P306.

Figure 10:
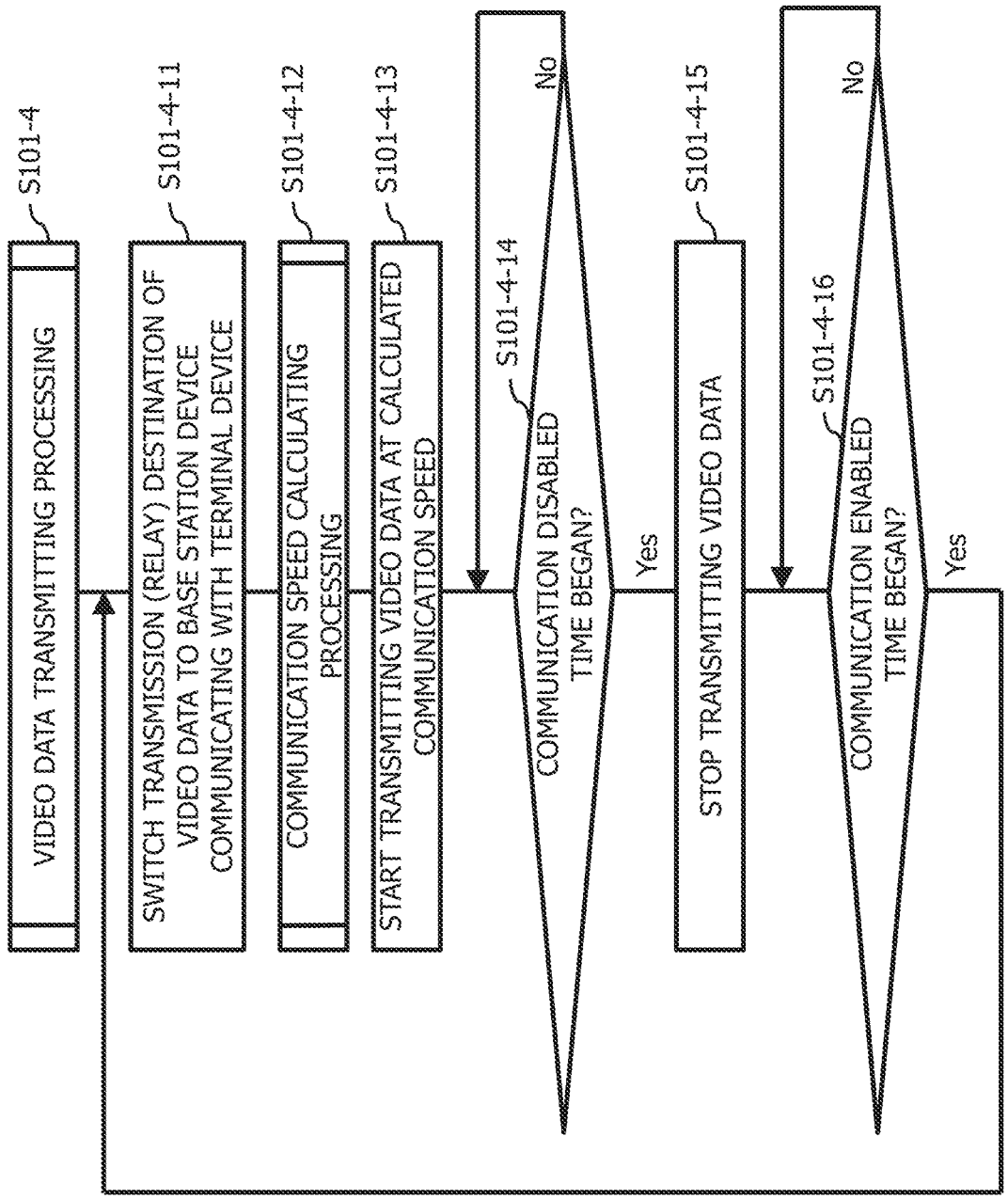
FIG. 10 is a processing flow chart depicting an example of the video data transmitting processing S101-4.

FIG. 10 is a processing flow chart depicting an example of the video data transmitting processing S101-4. The relay device 200 switches a transmission destination base station device 400 of the video data to a base station device 400 which is communicating (or which is predicted to be communicating) with the terminal device 100 (S101-4-11). Then the relay device 200 performs a communication speed calculating processing (S101-4-12).

The communication speed calculating processing S101-4-12 is a processing similar to the communication speed calculating processing S101-4-1 in FIG. 7, for example.

The relay device 200 starts transmitting the video data at the calculated communication speed (S101-4-13). The relay device 200 continues transmitting the video data until the communication disabled time (or time that is predicted as the communication disabled time) begins (No in S101-4-14).

When the communication disabled time begins (Yes in S101-4-14), the relay device 200 stops transmission of the video data (S101-4-15). Then the relay device 200 waits for the transmission enable time (or the time predicted as the communication enabled time) (No in S101-4-16).

When the transmission enabled time begins (YES in S101-4-16), the relay device 200 performs the processing S101-4-11 to the processing S101-4-16 again. The relay device 200 repeats the above processing until the live broadcast ends.

In FIG. 9, the relay device 200 switches the transmission destination base station device 400 of the video data from the base station device 400-1 to the base station device 400-2 at the 5 second point, for example (S101-4-11, in FIG. 8). In the same manner, the relay device 200 switches [the transmission destination base station device 400] to the base station device 400-3 and the base station 400-4 at the 7 second point and 11 second point respectively (S101-4-11 in FIG. 8).

According to Embodiment 2, the relay device 200 switches the transmission destination base station device 400 of the video data by predicting the moving position of the terminal device 100. Since the relay device 200 does not transmit the video data to a base station device 400 which is not communicating with the terminal device 100, the communication resources between the relay device 200 and the base station device 400 can be used efficiently.

Embodiment 3

Prediction of Communication Disabled Time Using Peripheral Information

Besides switching base stations, the relay device 200 may predict the communication disabled time based on the peripheral information. FIG. 11 is a diagram depicting an example of predicting the communication disabled time based on the predicted peripheral information. For example, the relay device 200 predicts that the moving path of the terminal device 100 is the path indicated by the arrow M3. The relay device 200 acquires an identifier, which identifies a road on which the terminal device 100 is moving, for example, from the terminal device 100, and predicts that the terminal device 100 will move on the path where the terminal device 100 is currently moving.

Then, based on the peripheral information, the relay device 200 recognizes that a tunnel T400 and a tunnel T401 exist on the road where the terminal device 100 is moving, for example. The relay device 200 predicts that a period P400 in which the terminal device 100 is passing the tunnel T400 and a period P401 in which the terminal device 100 is passing the tunnel T401 are the communication disabled periods due to interruption of the radio wave by the tunnels. In this way, the relay device 200 may predict the communication disabled period based on the peripheral information.

Change of Terminal Information

The relay device 200 may acquire such information as a position and a moving speed of the terminal device 100, NS an identifier of the road (this information is called "terminal information") periodically or non-periodically. FIG. 12 is a diagram depicting an example of a sequence of a terminal information change notification. When the relay device 200 receives a terminal information change notification, which notifies the change of the terminal information, from the terminal device 100 (S400), the relay device 200 performs a communication disabled time re-predicting processing (S401). The communication disabled time re-predicting processing S401 is a processing similar to the communication disabled time predicting processing S101-2 in FIG. 4, for example.

By acquiring the latest terminal information, the relay device 200 can perform an even more accurate prediction.

According to one aspect, the live video image can be viewed without interruption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A relay device in a communication system including a terminal device, a video distribution device configured to distribute video data to the terminal device, and the relay device configured to relay video data distributed by the video distribution device, the relay device comprising:
a storage configured to receive distributed video data, and store the distributed video data as stored video data;

a communication disabled period predictor configured to predict a communication disabled period in which the terminal device is unable to perform communication, as a switching time for the terminal device to switch base stations with which radio connection is performed, based on information about a position, a moving direction, and a moving speed of the terminal device acquired from the terminal device; and a transmission controller configured to start transmission of the stored video data to the terminal device after a start delay period elapses from when storing of the disabled video data in the storage starts, wherein the transmission controller transmits first video data and second video data, both included in the stored video data, to the terminal device in a first communication enabled period, wherein the first video data is to be played by the terminal device in the first communication enabled period in which the terminal device is predicted to be enabled to perform communication, wherein the second video data is to be played by the terminal device in a second communication disabled period following the first communication enabled period, wherein the transmission controller does not transmit third video data, included in the stored video data, to the terminal device in the first communication enabled period, and wherein the third video data is played by the terminal device in a third period after the second communication disabled period.

2. The relay device according to claim 1, wherein the communication system includes a plurality of base station devices which performs radio connection with the terminal device.

3. The relay device according to claim 2, wherein the transmission controller calculates the start delay period according to the switching time.

4. The relay device according to claim 3, wherein the transmission controller calculates the start delay period according to a longest communication disabled period in the predicted communication disabled periods.

5. The relay device according to claim 2,
further including base station position information on positions of the plurality of base station devices,
wherein the predictor acquires terminal information, which includes terminal position information on a position of the terminal device, from the terminal device, and predicts the switching time based on the base station position information and the terminal position information.

6. The relay device according to claim 5, wherein the terminal information includes moving speed information on a moving speed of the terminal device.

7. The relay device according to claim 5, wherein the terminal information includes road information to identify a road on which the terminal device is located.

8. The relay device according to claim 1,
further including map information on a peripheral area of the terminal device,
wherein the predictor predicts the communication disabled period based on the map information.

9. The relay device according to claim 2, wherein the transmission controller switches base station devices, to which the first video data and the second video data are transmitted, according to the switching of the base station devices with which the terminal device performs radio connection.

10. The relay device according to claim 1, wherein when the first video data and the second video data are transmitted in the first communication enabled period, the transmission controller controls such that the communication speed becomes a value determined by dividing total volume of the first video data and the second video data to be transmitted in the first communication enabled period by the first communication enabled period.

11. The relay device according to claim 5, wherein the predictor predicts the communication disabled period when the terminal device receives the terminal information.

12. A relay method of a relay device in a communication system including a terminal device, a video distribution device configured to distribute video data to the terminal device, and the relay device configured to relay video data distributed by the video distribution device, the relay method comprising:
receiving distributed video data;
storing the distributed video data received in said receiving as stored video data;
predicting a communication disabled period in which the terminal device is disabled to perform communication, as a switching time for the terminal device to switch base stations with which radio connection is performed, based on information about a position, a moving direction, and a moving speed of the terminal device acquired from the terminal device;
starting transmission of the stored video data to the terminal device after a start delay period elapses from when the storing starts; and
transmitting first video data and second video data, both included in the stored video data, to the terminal device in a communication enabled period in which the terminal device is predicted to be enabled to perform communication, the communication disabled period following the communication enabled period, and the first video data to be played by the terminal device in the communication enabled period,
wherein the transmission controller does not transmit third video data, included in the stored video data, to the terminal device in the first communication enabled period, and
wherein the third video data is played by the terminal device in a third period after the second communication disabled period.

13. A live video image distribution system, comprising:
a terminal device;
a video distribution device configured to distribute video data to the terminal device; and
a relay device configured to relay video data distributed by the video distribution device, the relay device including:
a storage configured to receive distributed video data, and store the distributed video data as stored video data,
a communication disabled period predictor configured to predict a communication disabled period in which the terminal device is unable to perform communication, as a switching time for the terminal device to switch base stations with which radio connection is performed, based on the information about a position, a moving direction, and a moving speed of the terminal device acquired from the terminal device, and a transmission controller configured to start transmission of the stored video data to the terminal device after a start delay period elapses from when storing of the distributed video data starts, wherein the transmission controller transmits first video data and second video data, both included in the stored video data, to the terminal device in a first communication enabled period, wherein the first video data is to be played by the terminal device in the first communication enabled period in which the terminal device is predicted to be enabled to perform communication, and wherein the second video data is to be played by the terminal device in a second communication disabled period following the first communication enabled period, wherein the transmission controller does not transmit third video data, included in the stored video data, to the terminal device in the first communication enabled period, wherein the third video data is played by the terminal device in a third period after the second communication disabled period, and wherein the terminal device plays the first and second video data in order of reception.

* * * * *